US008693952B2

(12) United States Patent
Yang et al.

(10) Patent No.: US 8,693,952 B2
(45) Date of Patent: Apr. 8, 2014

(54) METHOD AND SYSTEM FOR ORDERLY CONNECTION OF A BLUETOOTH HEADSET CONTROLLED BY TERMINAL

(75) Inventors: Xin Yang, Shenzhen (CN); Zhiping Zhang, Shenzhen (CN); Qihong Fu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 230 days.

(21) Appl. No.: 13/257,912

(22) PCT Filed: Dec. 15, 2009

(86) PCT No.: PCT/CN2009/075590
§ 371 (c)(1),
(2), (4) Date: Feb. 13, 2012

(87) PCT Pub. No.: WO2011/017875
PCT Pub. Date: Feb. 17, 2011

(65) Prior Publication Data
US 2012/0135686 A1    May 31, 2012

(30) Foreign Application Priority Data
Aug. 13, 2009 (CN) .......................... 2009 1 0162769

(51) Int. Cl.
*H04B 7/00* (2006.01)
(52) U.S. Cl.
USPC ................ 455/41.2; 455/41.1; 455/432.3
(58) Field of Classification Search
USPC ................ 455/41.1, 41.2, 432.3, 556.1
See application file for complete search history.

(56) References Cited

U.S. PATENT DOCUMENTS

2009/0053997 A1* 2/2009 Jobling et al. ............... 455/41.2
2009/0061769 A1  3/2009 Zimbric et al.

FOREIGN PATENT DOCUMENTS

| CN | 101075828 A |   | 11/2007 |           |
|----|-------------|---|---------|-----------|
| CN | 101159451   | * | 4/2008  | H04B 5/00 |
| CN | 101159451 A |   | 4/2008  |           |
| CN | 101499824 A |   | 8/2009  |           |

OTHER PUBLICATIONS

International Search Report on international application No. PCT/CN2009/075590, mailed on May 20, 2010.
English Translation of the Written Opinion of the International Search Authority in international application No. PCT/CN2009/075590, mailed on May 20, 2010.

* cited by examiner

*Primary Examiner* — Tuan H Nguyen
(74) *Attorney, Agent, or Firm* — Oppedahl Patent Law Firm LLC

(57) ABSTRACT

The disclosure provides a method for orderly connection of a bluetooth headset controlled by a terminal. The method includes: a terminal sets Hands-Free Profile (HFP) service status as visible and connectable, and sets Advanced Audio Distribution Profile (A2DP) service status and Audio Video Remote Control Profile (AVRCP) service status as invisible and unconnectable; a bluetooth headset sends an HFP connection request to the terminal; and the terminal sends a response of accepting an HFP connection to the bluetooth headset. The disclosure also provides a system for orderly connection of a bluetooth headset controlled by a terminal. Application of the method and system may avoid different connection order of the profiles due to different manufacturers of the bluetooth headset when the bluetooth headset actively initiates a connection, which achieves a compatible connection of the profiles.

12 Claims, 2 Drawing Sheets

METHOD AND SYSTEM FOR ORDERLY CONNECTION OF A BLUETOOTH HEADSET CONTROLLED BY TERMINAL

TECHNICAL FIELD

The disclosure relates to the field of bluetooth wireless communications, specifically to a method and system for orderly connection of a bluetooth headset controlled by a terminal.

BACKGROUND

Bluetooth is an open standard of wireless data and voice transmission, which links together various communication devices, computers and terminal devices thereof, various digital data systems, etc., in a wireless manner, mainly to solve the problem of the wireless communication of a short distance (the effective communication distance is no more than 10 meters in general). The bluetooth headset refers to a hands-free headset in which the bluetooth technology is applied, which makes the user can easily communicate by the telephone in various ways without the annoyance of wires.

The bluetooth Special Interest Group (SIG) draws up and issues the bluetooth protocol standard, in which different profiles are defined according to different logic functions of the bluetooth. Wherein a HeadSet Profile (HSP) and a Hands-Free Profile (HFP) are formulated to enable answering and dialing a voice telephone via the bluetooth headset; an Advanced Audio Distribution Profile (A2DP) is formulated to enable hearing stereo music via the bluetooth headset; and an Audio Video Remote Control Profile (AVRCP) is formulated to realize controlling of the played music while listening to stereo music, for example, playing, halting, pausing, previous, next, etc. In the above four profiles, the HFP can be viewed as a superset of the HSP, and the HFP and HSP can be treated as the same profile application. Although the A2DP and AVRCP are two different profiles, and are independent from, not dependent on each other in the bluetooth protocol standard, they are usually coexistent and provide bluetooth stereo music function to the user together.

During the application process of the bluetooth device, respective connection operations must be performed for different profiles respectively before using the functions corresponding to respective profiles. In the existing technology, when the user uses a bluetooth headset integrated with the three profiles HFP, A2DP and AVRCP, the bluetooth headset will initiate three different connection requests to a terminal, and correspondingly, the terminal will frequently pop out prompt boxes to inform the user that there are different profiles having been connected. This is too professional for the user of the bluetooth headset, and in fact, the user needs only one connection prompt informing that the bluetooth headset has been connected. It can be seen that the existing bluetooth headset is poor in ease of use and usage friendliness.

In addition, the bluetooth SIG only formulated the application specifications of respective profiles, but has not regulated a processing flow when the three profiles HFP, A2DP and AVRCP are coexistent, namely, has not regulated a connection order of the three profiles HFP, A2DP and AVRCP. In the prior art, when the terminal actively initiates a connection to the bluetooth headset, the terminal can control the order of the connection initiated by the bluetooth headset, however, when the bluetooth headset actively initiates a connection to the terminal, the terminal cannot control the order of the connection initiated by the bluetooth headset. Therefore, when the bluetooth headsets which are manufactured by different bluetooth headset manufacturers and have different profile connection processing flows actively initiate a connection to the terminal, a problem of incompatible profile connection will occur at the terminal, resulting in that some profiles have been connected with the terminal, while some profiles are not connected with the terminal, and furthermore, connection information displayed on the terminal interface may be not in accordance with the actual connection situation of the profile, thus decreasing the user experience.

SUMMARY

In view of this, the disclosure mainly aims to provide a method and system for orderly connection of a bluetooth headset controlled by a terminal, for solving the problem of incompatibility due to different profile connection order when the bluetooth headset actively initiates a connection to the terminal.

To achieve the above purpose, the technical solution of the disclosure is realized as follows.

The disclosure provides a method for orderly connection of a bluetooth headset controlled by a terminal, and the method includes:

setting, by a terminal, its Hands-Free Profile (HFP) service status as visible and connectable, and setting its Advanced Audio Distribution Profile (A2DP) service status and Audio Video Remote Control Profile (AVRCP) service status as invisible and unconnectable;

sending, by a bluetooth headset, an HFP connection request to the terminal; and sending, by the terminal, a response of accepting an HFP connection to the bluetooth headset.

Wherein the method may further include: after the bluetooth headset sends the HFP connection request to the terminal, inquiring, by the terminal, whether the bluetooth headset has A2DP and AVRCP services after receiving the HFP connection request, and then orderly executing an operation of connection with the bluetooth headset after determining that the bluetooth headset has A2DP and AVRCP services.

Wherein the method may further include: after the terminal inquires whether the bluetooth headset has A2DP and AVRCP services, sending, by the terminal, the response of accepting the HFP connection to the bluetooth headset after determining that the bluetooth headset does not have A2DP and AVRCP services, and ending the connection establishing process.

In the above solution, orderly executing the operation of connection with the bluetooth headset by the terminal after determining that the bluetooth headset has A2DP and AVRCP services may be specifically as follows:

initiating an AVRCP connection request to the bluetooth headset, accepting, by the bluetooth headset, establishment of an AVRCP connection, and informing the terminal of a connection result; and initiating, by the terminal, an A2DP connection request to the bluetooth headset after receiving a message that an AVRCP connection has been established, then accepting, by the bluetooth headset, establishment of an A2DP connection and informing the terminal of a connection result; or initiating the A2DP connection request to the bluetooth headset, accepting, by the bluetooth headset, the establishment of the A2DP connection, and informing the terminal of the connection result; and initiating, by the terminal, the AVRCP connection request to the bluetooth headset after receiving a message that the A2DP connection has been established, then accepting, by the bluetooth headset, the establishment of the AVRCP connection and informing the terminal of the connection result.

In the above solution, the method may further include: after the terminal sends the response of accepting the HFP connection to the bluetooth headset, informing, by the terminal, a user of successful establishment of the connection between the bluetooth headset and the terminal.

Furthermore, the method may further include: after the terminal receives the HFP connection request, popping out, by the terminal, a dialogue box on an interface to prompt the user that there is a bluetooth headset initiating a connection.

The disclosure further provides a system for orderly connection of a bluetooth headset controlled by a terminal, and the system includes a terminal and a bluetooth headset, wherein the terminal is configured to set its HFP service status as visible and connectable, and set its A2DP service status and AVRCP service status as invisible and unconnectable; and send a response of accepting an HFP connection to the bluetooth headset; and the bluetooth headset is configured to send an HFP connection request to the terminal, and receive the response of accepting the HFP connection sent by the terminal.

Wherein the terminal may be further configured to inquire whether the bluetooth headset has A2DP and AVRCP services after receiving the HFP connection request sent by the bluetooth headset, and then orderly execute an operation of connection with the bluetooth headset after determining that the bluetooth headset has A2DP and AVRCP services; and correspondingly, the bluetooth headset may be further configured to orderly execute an operation of connection with the terminal after the terminal determines that the bluetooth headset has A2DP and AVRCP services.

Wherein the terminal may be further configured to send the response of accepting the HFP connection to the bluetooth headset after determining that the bluetooth headset does not have A2DP and AVRCP services; and correspondingly, the bluetooth headset may be further configured to receive the response of accepting the HFP connection sent by the terminal.

In the above solution, the terminal may be further configured to, after receiving the HFP connection request, pop out a dialogue box on an interface to prompt the user that there is a bluetooth headset initiating a connection; and further configured to inform the user of successful establishment of the connection between the bluetooth headset and the terminal after sending the response of accepting the HFP connection to the bluetooth headset.

In the method and system for orderly connection of a bluetooth headset controlled by a terminal provided by the disclosure, the terminal sets its HFP service status as visible and connectable, and sets its A2DP service status and AVRCP service status as invisible and unconnectable; the bluetooth headset sends the HFP connection request to the terminal; and the terminal sends the response of accepting the HFP connection to the bluetooth headset. The disclosure successfully avoids different connection order of the profiles due to different manufacturers of bluetooth headset when the bluetooth headset actively initiates the connection, which solves the problem of incompatible connection of the profiles.

Furthermore, according to the disclosure, after sending the response of accepting the HFP connection to the bluetooth headset, the terminal informs the user of the successful establishment of connection between the bluetooth headset and the terminal, which avoids that the terminal frequently pops out prompt boxes to inform the user that there are different profiles having been connected, thus improves the ease of use and usage friendliness of the bluetooth headset.

DETAILED DESCRIPTION

The main idea of the disclosure is: a terminal sets its HFP service status as visible and connectable, and sets its A2DP service status and AVRCP service status as invisible and unconnectable; a bluetooth headset initiates an HFP connection request to the terminal; the terminal sends a response of accepting the HFP connection to the bluetooth headset.

Here, after the bluetooth headset initiates the HFP connection request to the terminal, the method further includes the step of: after receiving the HFP connection request, the terminal inquires whether the bluetooth headset has A2DP and AVRCP services, and then orderly executes connection operations with the bluetooth headset after determining that the bluetooth headset has A2DP and AVRCP services.

Furthermore, after sending the response of accepting the HFP connection to the bluetooth headset, the terminal informs the user of the successful establishment of connection between the bluetooth headset and the terminal.

In the disclosure, the basis for the terminal to set the HFP service status as visible and connectable is: the existing low-end bluetooth headset only provides the HFP service, while the middle-end and high-end HFP bluetooth headset provides A2DP and AVRCP services in addition to the HFP service, that is to say, it is the common function for the bluetooth headset to provide the HFP service.

In the disclosure, the step of the bluetooth headset actively initiates the connection refers to that the bluetooth headset initiates the connection to the terminal firstly.

The disclosure is explained below with reference to accompanying drawings and embodiments in detail.

Figure 1:
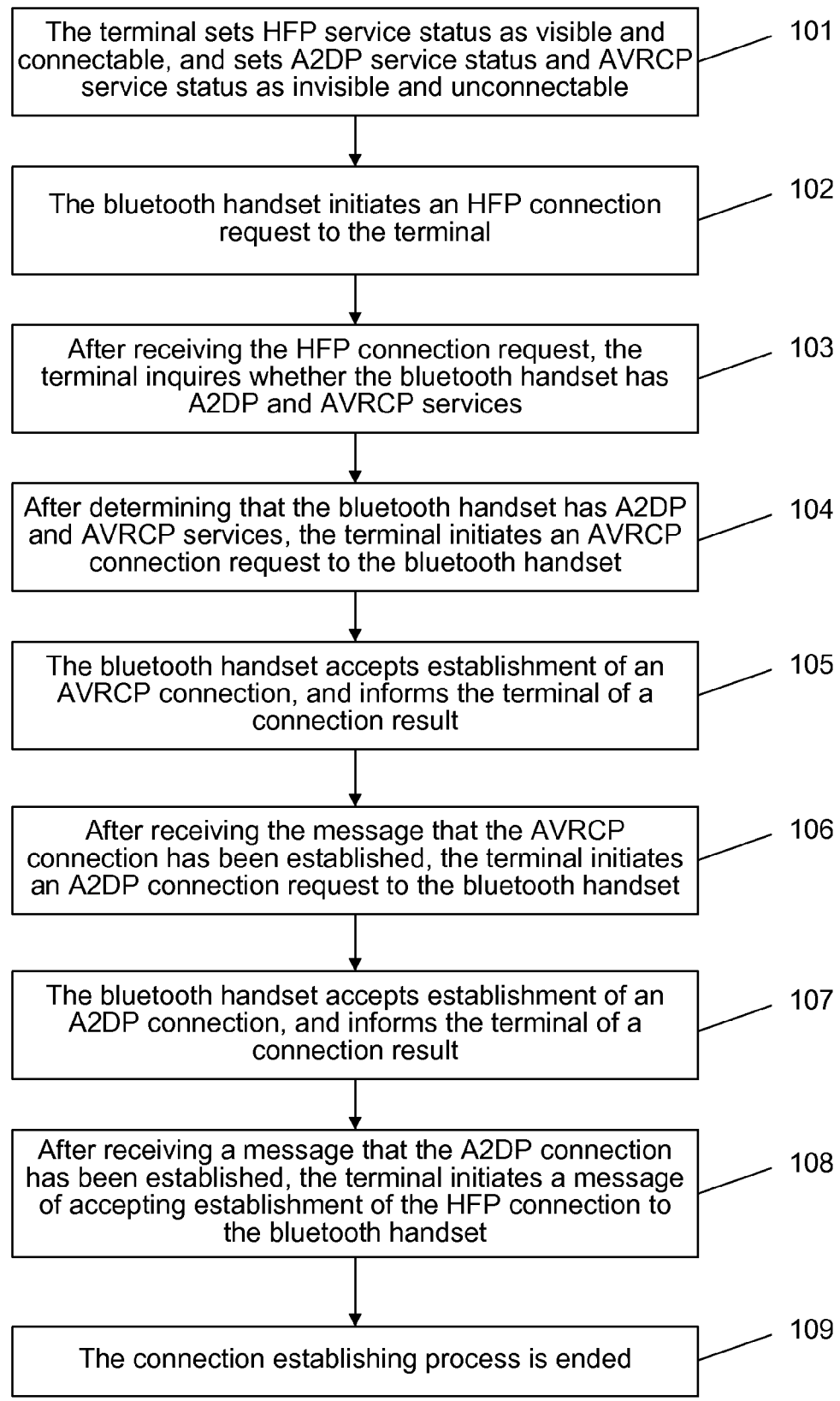
FIG. 1 is a schematic diagram of realization flow of a method for orderly connection of a bluetooth headset controlled by a terminal according to the disclosure.

FIG. 1 is a schematic diagram of realization flow of a method for orderly connection of a bluetooth headset controlled by a terminal according to the disclosure; as shown in FIG. 1, the flow comprises following steps.

Step 101: the terminal sets its HFP service status as visible and connectable;

specifically, after the terminal is started, a host in the terminal sends an instruction of setting device class, that is, HCI_Write_Class_of_Device, to a Link Manager (LM) in the terminal; after receiving the instruction HCI_Write_Class_of_Device, the LM in the terminal returns an instruction of setting device scannable, that is, HCI_Write_Scan_Enable, to the host in the terminal, such that the HFP service of the terminal is visible and connectable.

The step further comprises at the same time: the terminal sets its A2DP service status and AVRCP service status as invisible and unconnectable, namely, the A2DP service status and the AVRCP service status of the terminal cannot be found by the bluetooth headset and cannot be connected by the bluetooth headset, and the specific process is carried out at the same time with the process that the terminal sets the HFP service status as visible and connectable, namely, the instruction HCI_Write_Class_of_Device sent by the host in the terminal and the instruction HCI_Write_Scan_Enable returned by the LM in the terminal comprise setting parameters of the HFP service status, as well as setting parameters of the A2DP service status and AVRCP service status.

Here, the step of setting the A2DP service status and the AVRCP service status as invisible and unconnectable is: the A2DP and the AVRCP of the terminal cannot be found by the bluetooth headset and the terminal cannot actively initiate a connection to the bluetooth headset, but the terminal can actively initiate the A2DP and AVRCP connections to the bluetooth headset.

Step 102: the bluetooth headset initiates an HFP connection request to the terminal;

specifically, a host in the bluetooth headset sends a create connection instruction HCI_Create_Connection (HFP) to an LM in the bluetooth headset; after receiving the HCI_Create_Connection (HFP), the LM in the bluetooth headset sends a host connection request signaling LMP_host_connection_req (HFP) to the LM in the terminal; after receiving the LMP_host_connection_req (HFP), the LM in the terminal sends a connection request instruction HCI_Connection_Request (HFP) to the host in the terminal.

Here, the bluetooth headsets supporting the HFP, A2DP and AVRCP services manufactured by different manufactures will further initiate the A2DP or AVRCP connection request to the terminal, but the bluetooth headset should initiate a signaling of requesting to acquire feature, namely LMP_features_req_ext before actively initiating the connection request, such that the A2DP service status and the AVRCP service status of the terminal are both invisible and unconnectable due to the setting in step 101, namely, a signaling LMP_features_res_ext responding to the feature request returned by the terminal will not contain the information of A2DP or AVRCP, therefore the bluetooth headset only initiates the HFP connection request to the terminal.

Step 103: after receiving the HFP connection request, the terminal inquires whether the bluetooth headset has A2DP and AVRCP services;

specifically, after receiving the instruction HCI_Connection_Request (HFP), the host in the terminal inquires in the local device information whether the bluetooth headset has A2DP and AVRCP services, wherein the local device information is internal exchange information between the bluetooth headset and the terminal before the bluetooth headset initiates the connection request to the terminal.

Here, after receiving the HFP connection request, the terminal further pops out a dialogue box on the interface to prompt the user that there is a bluetooth headset initiating a connection, for example, the bluetooth headset requests to establish a connection with the terminal, if the user accepts, the terminal inquires whether the bluetooth headset has A2DP and AVRCP services, and performs the subsequent connection operations, or if the user does not accept, the connection is ended.

Step 104: after determining that the bluetooth headset has A2DP and AVRCP services, the terminal initiates an AVRCP connection request to the bluetooth headset;

specifically, after the terminal determines that the bluetooth headset has A2DP and AVRCP services, the host in the terminal sends a create connection instruction HCI_Create_Connection (AVRCP) to the LM in the terminal; after receiving the HCI_Create_Connection (AVRCP), the LM in the terminal sends a host connection request signaling LMP_host_connection_req (AVRCP) to the LM in the bluetooth headset, then the LM in the bluetooth headset sends a connection request signaling HCI_Connection_Request (AVRCP) to the host in the bluetooth headset.

Here, if the terminal determines that the bluetooth headset does not have A2DP and AVRCP services, namely the bluetooth headset only has the HFP service, then the terminal sends the response of accepting the HFP connection to the bluetooth headset, and the connection establishing process is ended.

Step 105: the bluetooth headset accepts the establishment of the AVRCP connection, and informs the terminal of a connection result;

specifically, after receiving the instruction HCI_Connection_Request (AVRCP), the host in the bluetooth headset sends a connection request accepting instruction HCI_Accept_Connection_Request (AVRCP) to the LM in the bluetooth headset; after receiving the HCI_Accept_Connection_Request (AVRCP), the LM in the bluetooth headset sends an accepting signaling LMP_accepted (AVRCP) to the LM in the terminal; after receiving the LMP_accepted (AVRCP), the LM in the terminal sends the connection complete instruction HCI_Connection_Complete (AVRCP) to the host in the terminal.

Here, since the bluetooth headset is a dumb terminal relative to the terminal, the bluetooth headset will automatically accept the connection request initiated by the terminal.

Step 106: after receiving a message that the AVRCP connection has been established, the terminal initiates an A2DP connection request to the bluetooth headset;

specifically, after receiving the HCI_Connection_Complete (AVRCP), the host in the terminal sends a create connection instruction HCI_Create_Connection (A2DP) to the LM in the terminal; after receiving the HCI_Create_Connection (A2DP), the LM in the terminal sends a host connection request signaling LMP_host_connection_req (A2DP) to the LM in the bluetooth headset, then the LM in the bluetooth headset sends a connection request instruction HCI_Connection_Request (A2DP) to the host in the bluetooth headset.

In the disclosure, if the terminal determines that the bluetooth headset has A2DP and AVRCP services, the terminal may also initiate the A2DP connection request to the bluetooth headset first, then initiate the AVRCP connection request after receiving a message that the A2DP connection has been established.

Step 107: the bluetooth headset accepts the establishment of the A2DP connection, and informs the terminal of the connection result;

specifically, after receiving the instruction HCI_Connection_Request (A2DP), the host in the bluetooth headset sends a connection request accepting instruction HCI_Accept_Connection_Request (A2DP) to the LM in the bluetooth headset; after receiving the HCI_Accept_Connection_Request (A2DP), the LM in the bluetooth headset sends an accepting signaling LMP_accepted (A2DP) to the LM in the terminal; after receiving the LMP_accepted (A2DP), the LM in the terminal sends a connection complete instruction HCI_Connection_Complete (A2DP) to the host in the terminal.

Step 108~109: after receiving a message that the A2DP connection has been established, the terminal initiates a message of accepting the establishment of the HFP connection to the bluetooth headset, and the connection establishing process is ended;

specifically, after receiving the HCI_Connection_Complete (A2DP), the host in the terminal sends a connection request accepting instruction HCI_Accept_Connection_Request (HFP) to the LM in the terminal; after receiving the HCI_Accept_Connection_Request (HFP), the LM in the terminal sends an accepting signaling LMP_accepted (HFP) to the LM in the bluetooth headset; after receiving the LMP_accepted (HFP), the LM in the bluetooth headset sends an HCI_Connection_Complete (HFP) to the host in the bluetooth headset.

After step 108, the process further comprises: the terminal informs the user of the successful establishment of the connection between the bluetooth headset and the terminal, for example, a connection between the bluetooth headset and the terminal have been established, and the bluetooth headset is usable.

Figure 2:
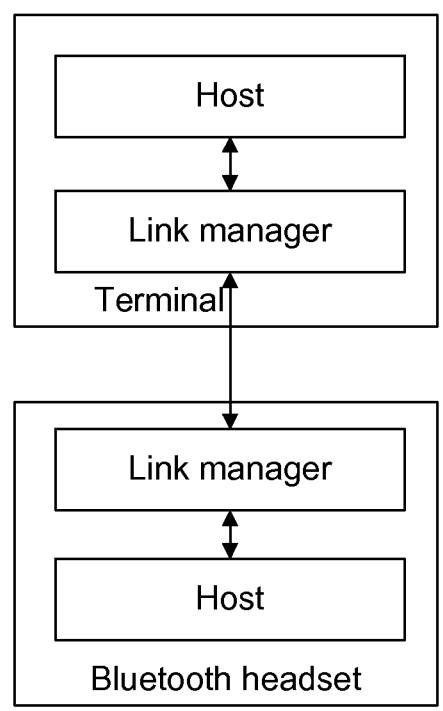
FIG. 2 is a structural schematic diagram of a device for orderly connection of a bluetooth headset controlled by a terminal according to the disclosure.

To realize above method, the disclosure further provides a system for orderly connection of a bluetooth headset controlled by a terminal; as shown in FIG. 2, the system includes a terminal and a bluetooth headset, wherein the terminal is configured to set its HFP service status as visible and connectable, and set its A2DP service status and AVRCP service status as invisible and unconnectable; and send a response of accepting the HFP connection to the bluetooth headset; and the bluetooth headset is configured to send an HFP connection request to the terminal, and receive the response of accepting the HFP connection sent by the terminal.

The terminal is further configured to, inquire whether the bluetooth headset has A2DP and AVRCP services after receiving the HFP connection request sent by the bluetooth headset, and then orderly execute an operation of connection with the bluetooth headset after determining that the bluetooth headset has A2DP and AVRCP services; and correspondingly, the bluetooth headset is further configured to orderly execute an operation of connection with the terminal after the terminal determines that the bluetooth headset has A2DP and AVRCP services.

Wherein the terminal further comprises a host and an LM, the bluetooth headset further includes a host and an LM; correspondingly, the terminal sets its HFP service status as visible and connectable, specifically:

the host in the terminal sends an instruction HCI_Write_Class_of_Device to the LM in the terminal; after receiving the instruction HCI_Write_Class_of_Device, the LM in the terminal returns an instruction HCI_Write_Scan_Enable to the host in the terminal;

inquiring, by the terminal, whether the bluetooth headset has A2DP and AVRCP services after receiving the HFP connection request sent by the bluetooth headset is specifically as follows:

after receiving the instruction HCI_Connection_Request (HFP), the host in the terminal inquires in the local device information whether the bluetooth headset has A2DP and AVRCP services;

the step that the terminal sends the response of accepting the HFP connection to the bluetooth headset and the bluetooth headset receives the response of accepting the HFP connection sent by the terminal is specifically as follows:

the host in the terminal sends the instruction HCI_Accept_Connection_Request (HFP) to the LM in the terminal; after receiving the HCI_Accept_Connection_Request (HFP), the LM in the terminal sends a signaling LMP_accepted (HFP) to the LM in the bluetooth headset; after receiving the signaling LMP_accepted (HFP), the LM in the bluetooth headset sends an HCI_Connection_Complete (HFP) to the host in the bluetooth headset; and the step that the bluetooth headset sends the HFP connection request to the terminal and the terminal receives the HFP connection request sent by the bluetooth headset is specifically as follows:

the host in the bluetooth headset sends an instruction HCI_Create_Connection (HFP) to the LM in the bluetooth headset; after receiving the HCI_Create_Connection (HFP), the LM in the bluetooth headset sends a signaling LMP_host_connection_req (HFP) to the LM in the terminal; after receiving the LMP_host_connection_req (HFP), the LM in the terminal sends an instruction HCI_Connection_Request (HFP) to the host in the terminal.

The terminal is further configured to set its A2DP service status and the AVRCP service status as invisible and unconnectable.

The terminal is further configured to send the response of accepting the HFP connection to the bluetooth headset after determining that the bluetooth headset does not have A2DP and AVRCP services; and correspondingly, the bluetooth headset is further configured to receive the response of accepting the HFP connection sent by the terminal.

The terminal is further configured to pop out a dialog box on the interface to prompt the user that there is a bluetooth headset initiating a connection after receiving the HFP connection request.

The terminal is further configured to inform the user of successful establishment of connection between the bluetooth headset and the terminal after sending the response of accepting the HFP connection to the bluetooth headset.

The above is only preferred embodiments of the disclosure and not intended to limit the protection scope of the disclosure, and any modifications, equivalent replacements, improvements and the like within the spirit and principle of the disclosure shall fall within the protection scope of the disclosure.

The invention claimed is:

1. A method for orderly connection of a bluetooth headset controlled by a terminal, comprising:
    setting, by a terminal, its Hands-Free Profile (HFP) service status as visible and connectable, and setting its Advanced Audio Distribution Profile (A2DP) service status and Audio Video Remote Control Profile (AVRCP) service status as invisible and unconnectable;
    sending, by a bluetooth headset, an HFP connection request to the terminal;
    inquiring, by the terminal, whether the bluetooth headset has A2DP and AVRCP services after receiving the HFP connection request, and then orderly executing an operation of connection with the bluetooth headset after determining that the bluetooth headset has A2DP and AVRCP services; and
    sending, by the terminal, a response of accepting an HFP connection to the bluetooth headset.

2. The method according to claim 1, further comprising: after the terminal inquires whether the bluetooth headset has A2DP and AVRCP services,
    sending, by the terminal, the response of accepting the HFP connection to the bluetooth headset after determining that the bluetooth headset does not have A2DP and AVRCP services, and ending the connection establishing process.

3. The method according to claim 2, wherein orderly executing the operation of connection with the bluetooth headset by the terminal after determining that the bluetooth headset has A2DP and AVRCP services is specifically as follows:
    initiating an AVRCP connection request to the bluetooth headset, accepting, by the bluetooth headset, establishment of an AVRCP connection, and informing the terminal of a connection result; and initiating, by the terminal, an A2DP connection request to the bluetooth headset after receiving a message that an AVRCP connection has been established, then accepting, by the bluetooth headset, establishment of an A2DP connection and informing the terminal of a connection result; or initiating the A2DP connection request to the bluetooth headset, accepting, by the bluetooth headset, the establishment of the A2DP connection, and informing the terminal of the connection result; and initiating, by the terminal, the AVRCP connection request to the bluetooth headset after receiving a message that the A2DP connection has been established, then accepting, by the bluetooth headset, the establishment of the AVRCP connection and informing the terminal of the connection result.

4. The method according to claim 2, wherein further comprising: after the terminal sends the response of accepting the HFP connection to the bluetooth headset, informing, by the terminal, a user of successful establishment of the connection between the bluetooth headset and the terminal.

5. The method according to claim 2, further comprising: after the terminal receives the HFP connection request,
popping out, by the terminal, a dialogue box on an interface to prompt the user that there is a bluetooth headset initiating a connection.

6. The method according to claim 1, wherein orderly executing the operation of connection with the bluetooth headset by the terminal after determining that the bluetooth headset has A2DP and AVRCP services is specifically as follows:
initiating an AVRCP connection request to the bluetooth headset, accepting, by the bluetooth headset, establishment of an AVRCP connection, and informing the terminal of a connection result; and initiating, by the terminal, an A2DP connection request to the bluetooth headset after receiving a message that an AVRCP connection has been established, then accepting, by the bluetooth headset, establishment of an A2DP connection and informing the terminal of a connection result; or
initiating the A2DP connection request to the bluetooth headset, accepting, by the bluetooth headset, the establishment of the A2DP connection, and informing the terminal of the connection result; and initiating, by the terminal, the AVRCP connection request to the bluetooth headset after receiving a message that the A2DP connection has been established, then accepting, by the bluetooth headset, the establishment of the AVRCP connection and informing the terminal of the connection result.

7. The method according to claim 1, wherein further comprising: after the terminal sends the response of accepting the HFP connection to the bluetooth headset, informing, by the terminal, a user of successful establishment of the connection between the bluetooth headset and the terminal.

8. The method according to claim 1, further comprising: after the terminal receives the HFP connection request,
popping out, by the terminal, a dialogue box on an interface to prompt the user that there is a bluetooth headset initiating a connection.

9. A system for orderly connection of a bluetooth headset controlled by a terminal, comprising a terminal and a bluetooth headset, wherein
the terminal is configured to set its HFP service status as visible and connectable, and set its Advanced Audio Distribution Profile (A2DP) service status and Audio Video Remote Control Profile (AVRCP) as invisible and unconnectable; and inquire whether the bluetooth headset has A2DP and AVRCP services after receiving the HFP connection request sent by the bluetooth headset, and then orderly execute an operation of connection with the bluetooth headset after determining that the bluetooth headset has A2DP and AVRCP services; and send a response of accepting an HFP connection to the bluetooth headset; and the bluetooth headset is configured to send an HFP connection request to the terminal, and orderly execute an operation of connection with the terminal after the terminal determines that the bluetooth headset has A2DP and AVRCP services and receive the response of accepting the HFP connection sent by the terminal.

10. The system according to claim 9, wherein the terminal is further configured to send the response of accepting the HFP connection to the bluetooth headset after determining that the bluetooth headset does not have A2DP and AVRCP services; and
correspondingly, the bluetooth headset is further configured to receive the response of accepting the HFP connection sent by the terminal.

11. The system according to claim 10, wherein the terminal is further configured to, after receiving the HFP connection request, pop out a dialogue box on an interface to prompt the user that there is a bluetooth headset initiating a connection; and further configured to inform the user of successful establishment of the connection between the bluetooth headset and the terminal after sending the response of accepting the HFP connection to the bluetooth headset.

12. The system according to claim 9, wherein the terminal is further configured to, after receiving the HFP connection request, pop out a dialogue box on an interface to prompt the user that there is a bluetooth headset initiating a connection; and further configured to inform the user of successful establishment of the connection between the bluetooth headset and the terminal after sending the response of accepting the HFP connection to the bluetooth headset.

* * * * *